United States Patent [19]

Roof

[11] 4,267,493
[45] May 12, 1981

[54] PRE-STEP TIMER CIRCUIT FOR DC MOTOR CONTROL

[75] Inventor: Richard W. Roof, West Columbia, S.C.

[73] Assignee: Square D Company, Palatine, Ill.

[21] Appl. No.: 40,806

[22] Filed: May 21, 1979

[51] Int. Cl.³ .............................................. H02P 1/04
[52] U.S. Cl. ................................... 318/443; 318/484; 318/446; 318/444; 318/490
[58] Field of Search ............... 318/443, 444, 484, 446, 318/490; 307/141, 141.4, 141.8; 340/309.1, 309.4, 309.6, 309.5

[56] References Cited

U.S. PATENT DOCUMENTS

| | | | |
|---|---|---|---|
| Re. 27,919 | 2/1974 | Pucher | 307/141.8 X |
| 3,700,914 | 10/1972 | Granieri et al. | 307/141 |
| 3,943,421 | 3/1976 | Shibata et al. | 318/484 |

*Primary Examiner*—Ulysses Weldon
*Attorney, Agent, or Firm*—Michael J. Femal

[57] ABSTRACT

A pre-step timer circuit for pre-advancing the next timer period (control step) in a DC motor controller, such as in a crane-hoist controller. A sensing resistor module is connected from the line side of a contactor coil of a preceding control step to the input of a timer module in series with the accelerating contactor coil in the next control step. This resistor module sensing the previous coil voltage provides a feed-forward path for the sensed voltage signal to pre-time the next timer module. So, if a master switch is left in the previous control step long enough for the next timer module to time out, then the next control step is actuated immediately when the master switch is advanced thereto.

6 Claims, 2 Drawing Figures

PRE-STEP TIMER CIRCUIT FOR DC MOTOR CONTROL

BACKGROUND OF THE INVENTION

This invention relates to a timer circuit for DC motor control, and more particularly to a pre-step timer circuit for operating a DC crane-hoist control system.

Typically, a timer module in a DC crane-hoist control system is a two-terminal device. The purpose of the timer module is to provide a fixed time delay between speed points or control steps. This allows time for the motor to accelerate and to develop sufficient speed, which, in turn, limits the motor current inrush to an acceptable maximum value. The timer module is wired in series with an accelerating contactor coil. It appears as a high impedance during its timing period. The timing period of a timer module is initiated by application of a voltage thereacross when a master switch or the like is advanced to that control step. With the contacts of the master switch closed for that control step, a trickle current flows through the timer module which is insufficient to pick-up the accelerating contactor coil in series therewith. Therefore, when a master switch of a DC motor controller is moved from a previous control step to the next control step, the energization of the accelerating contactor coil in the next control step is delayed by the timer module for a predetermined fixed time, called an anticipation delay. Upon the completion of the timing cycle, the timer module appears as a contact closure (low series impedance) and, therefore, a greater flow of current occurs whereby the accelerating contactor coil is energized. The timing cycle of the timer module is obtained by use of a resistor-capacitor exponential curve and a programmable unijunction transistor voltage comparator (hereinafter called P.U.T.). Upon completion of the required timing period, or anticipation delay period, the P.U.T. provides a current pulse to the gate of a silicon controlled rectifier (hereinafter called SCR). The SCR then goes into conduction and provides a low impedance path or, in other words, a contact closure.

Next, when the master switch is advanced to the next control step, the accelerating contactor of the next control step is delayed by the timer module for its predetermined fixed time. This anticipation delay is a disadvantage when the operator is using the crane-hoist control in a "jogging" sequence. A jogging sequence is when the master switch of the controller is maintained in a control step (speed point), such as the first speed point, and momentarily moved to the next speed point for positioning of a load, etc. When only the timer module circuits of prior art crane-hoist controllers are used, the operator must anticipate this time delay, since the timer module of the next higher speed is not initiated until the master switch is advanced to that next higher speed position. It was in an effort to provide a crane-hoist control system for DC motors, which can be run in a jogging sequence without the anticipation time delay between control steps or speed points on the master switch of the DC motor controller, that the present invention came about.

SUMMARY OF THE INVENTION

With this invention, the foregoing problems are substantially solved. In accordance with the present invention, a sensing resistor module is connected between the line side of an accelerating contactor coil of one speed control step to the load side of the accelerating contactor coil and to the input of a timer module in series therewith in a subsequent speed control step. In other words, the actual hardware used to implement this pre-step timer function is simple, comprising a sensing resistor module connected from the line side of the coil of the preceding accelerating contactor to the input of the next timer module in a subsequent control step. This connection provides the necessary feed forward path to pre-advance the next timer period (control step). The timer module is specifically designed to use a small amount of current, such as that which flows through the sensing resistor module, in order to pre-time the next timer module in a subsequent control step before an operator advances the master switch to that subsequent control step. The sensing of the previous coil voltage to provide a signal for pre-timing the next timer module in a subsequent control step permits the accelerating contactor coil of the subsequent control step to be actuated immediately when the master switch is advanced, such as in a jogging sequence by the operator, without the anticipation delay period.

DESCRIPTION OF THE DRAWINGS

Further objects and advantages of the invention will be readily apparent to those skilled in the art from the following specification and from the appended drawings illustrating certain preferred embodiments, in which.

DESCRIPTION OF THE PREFERRED EMBODIMENT

Figure 1:
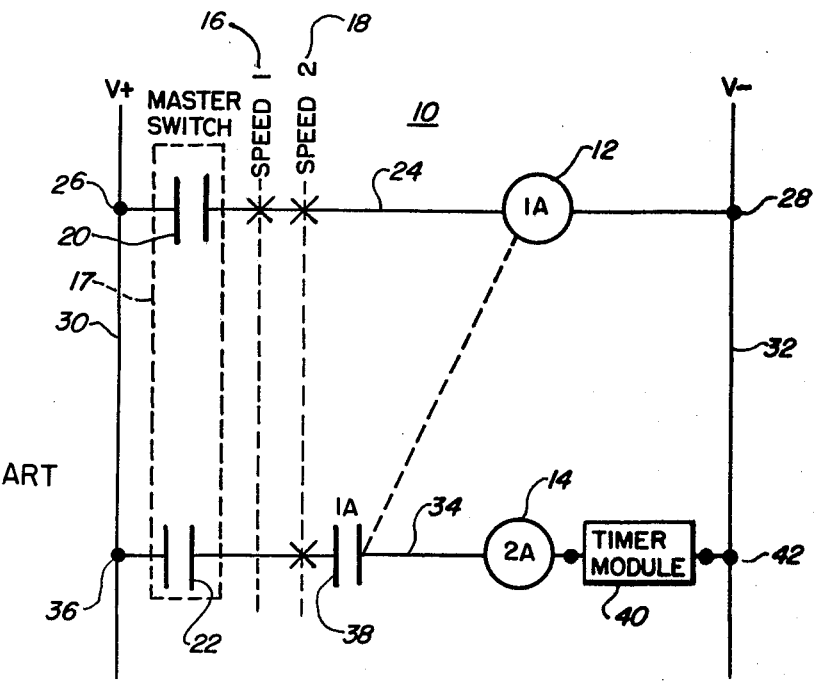
FIG. 1 is a partial schematic wiring diagram of a typical crane-hoist control circuit for DC motors.

Referring to FIG. 1, a typical crane-hoist control circuit 10 for DC motors is shown. To simplify the explanation of circuit 10 and its operation, only two control steps (speed points) are shown. Normally, a crane-hoist controller of this type includes five or more speed points on 230-volt DC controllers depending upon the horsepower rating of the motor. The five-speed point controllers have four accelerating contactors and, in this case, as shown in FIG. 1, a first accelerating contactor 12 controls the first speed point and a second accelerating contactor 14 controls the second speed point. A master switch 17 includes a first speed point 16 and a second speed point 18 indicating the closure of master switch contacts 20 and 22, respectively, which, in turn, energize accelerating contactors 12 and 14.

A conductor 24 extends between a junction 26 and a junction 28 and forms a series connection comprising the junction 26, normally open contacts 20 of the master switch 17, the accelerating contactor coil 12, and the junction 28. The series circuit on conductor 24 is preferably attached to a V+ line 30 at the junction 26 and is grounded to a V− line 32 at the junction 28.

A conductor 34 forms a series connection from a junction 36 attached to V+ line 30, through normally open contacts 22 of master switch 17, auxiliary contacts 38 of accelerating contactor 12, the accelerating contactor coil 14, a timer module 40 serving as a predetermined, fixed time delay, and a junction 42 connected to the V— line 32. The accelerating contactor 12, which includes the auxiliary contacts 38 on the conductor 34 of the second speed point or control step, closes the auxiliary contacts 38 upon its energization. When the operator advances the master switch from speed point one to speed point two, master switch contacts 22 are closed and master switch contacts 20 of the first speed point remain closed so that accelerating contactor coil 12 remains energized thereby maintaining auxiliary contacts 38 in a closed position.

The master switch 17 and circuit 10 could be a Square D Class 9004 VM or CM master switch. The accelerating contactors 12 and 14 typically might by Square D Class 7004 Type M Contactors.

The timer module 40 connected in series between the load side of accelerating contactor 14 and the V— line 32 might, for example, be a Square D Class 8962 Type N Solid State Timer. The timer module 40 delays the energization of accelerating contactor 14 when the timer 40 is placed in series with the contactor coil 14. This time delay, sometimes called anticipation delay, permits the motor to accelerate and to develop a given amount of torque to overcome the inertia of the motor and the load thereon before speed of the motor is changed once again when the operator advances the master switch to its next speed point. Therefore, timer module 40 prevents any current or torque peak that could damage the motor as the operator advances the master switch from one speed point to the next higher speed point.

In operation, the operator turns the master switch 17 to its first speed point 16, which closes master switch contacts 20 and, in turn, energizes accelerating contactor 12 immediately since there is no timer module 40 in series therewith. Upon the energization of accelerating contactor 12, auxiliary contacts 38 close on conductor 34 on the second speed point or control step. Then, when the operator wants to increase the speed of the motor, such as in a jogging sequence previously described, the master switch is advanced to its second speed point 18, which closes contacts 22 to energize accelerating contactor 14. However, even though the master switch 17 was momentarily maintained in the first speed point 16, which brought the motor up to its proper speed and torque, such as 20% of top speed in its first speed position, and it now can be advanced without damaging the motor, the timer module 40 in series with the accelerating contactor 14 acts as a normally open contact until it times out. Accelerating contactor 14, which is delayed by the timer 40 for its predetermined, fixed time, could be energized immediately since the motor has already been brought up to speed when the master switch was momentarily maintained at its first speed point 16. This causes an annoying anticipation delay while the operator waits until the timer module 40 times out.

Figure 2:
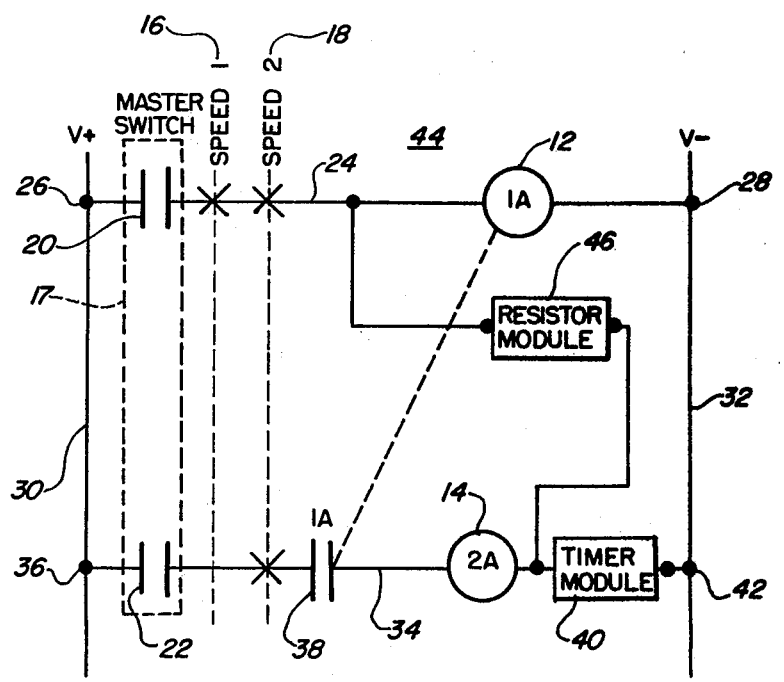
FIG. 2 is a partial schematic wiring diagram of the crane-hoist control system of FIG. 1 incorporating a sensing resistor module in accordance with this invention.

Referring now to FIG. 2, a preferred embodiment of a pre-step fixed timer circuit 44 for a DC motor in a crane-hoist control system of the present invention is illustrated. Once again, 230 volts DC is across V+ line 30 and V— line 32. Components 12 through 40 function similar to those as previously described for circuit 10 of FIG. 1. In addition to the components previously described above for FIG. 1, the pre-step fixed timer circuit 44 additionally includes a sensing resistor module 46 connected from the line side of accelerating contactor coil 12 of the preceding speed point 16 to the input of the timer module 40 in series with the accelerating contactor coil 14 of the second speed point 18. Thus, the predetermined, fixed timing period of timer module 40 is initiated when control voltage is applied to the accelerating contactor coil 12 of the first speed point 16, since the sensing resistor module 46 provides a feed forward path which permits a small amount of current to flow therethrough to pre-time the timer module 40 while master switch is momentarily maintained in its first speed point 16. Upon the completion of its timing period, a timer module 40 again appears as a low impedance and will allow immediate energization of the accelerating contactor coil 14 when the master switch is advanced from its first speed point 16 to its second speed point 18. This is a most advantageous feature when the operator is using the crane-hoist control in a jogging sequence. As referred to earlier, the jogging sequence is when the master switch is momentarily maintained in a first speed point 16 and then later moved to the next speed point 18 for positioning of a load, etc. When only the timer module 40 is used, the operator must anticipate the delay since the timing period of the timer module 40 is not initiated until the master switch 17 is advanced to its second speed position 18. With the resistor module 46 installed and the master switch 17 maintained momentarily in its first speed position 16 for the required fixed time delay of the timer module 40, the anticipation delay will not occur when the operator advances the master switch to its second speed point 18. In this case, the accelerating contactor coil 14 will immediately be energized, eliminating the anticipation delay.

Since the timing module 40 is specifically designed to use only a small amount of current (insufficient to operate accelerating contactor 14) that flows through accelerating contactor 14 when master switch contacts 22 and auxiliary contacts 38 are closed, the sensing resistor module 46 provides the same small amount of current to initiate the timing period of timer module 40, even though master switch contacts 22 are open. Further, if the operator does not maintain the master switch momentarily at its first speed point 16 for the predetermined, fixed time of timer module 40, then the remaining time will be made up upon closure of master switch contacts 22 when the master switch is advanced to its second speed point 18. However, the anticipation delay is reduced by the amount of time that the master switch was maintained in its first speed position 16, which, of course, is less time than when only the timer module 40 is used without the sensing resistor module 46.

Preferably, the sensing resistor module 46 is sized to sense the previous coil voltage of accelerating contactor 12 and to provide a trickle or small amount of current to flow therethrough to the timing module 40 so that the timing module 40 will go through its fixed time period and then time out, so that it's equivalent to a normally closed contact when the master switch is advanced to its next speed point. When the master switch is in its second speed point 18 and accelerating contactors 12 and 14 are picked up and, now, the operator goes to an off point on the master switch, both of the master switch contact 20 and 22 are open and, when this occurs, a very high voltage is induced across the resistor module 46, which is basically in parallel with accelerating contactor 12 when timing module 26 is timed out and equivalent to a low impedance. This induced voltage is in the range of 16,000 to 20,000 volts and although the resistor module 46 typically only needs to dissipate about four watts because most of the energy is dissipated in the arc across the master switch contacts and the accelerating contactors, the resistor module 46 should be chosen so it can momentarily withstand these high induced voltages. The entire resistor module 46 should be encapsulated in an epoxy resin or the like to prevent physical damage from shock, vibration, or atmospheric contaminants.

Although the pre-step timer circuit of this invention has been disclosed for use in a crane-hoist control system for DC motors, it is usable in any AC or DC motor control system wherein it's desirable to sense the previous voltage in a control step to use and that sensed control voltage to pre-time a timer module in the next control step.

I claim:

1. A pre-step timer circuit for a motor control system having at least two control step circuits, improvement comprising:

a source of potential;

means connected to said source of potential and forming part of said control step circuits for switching therebetween in a pre-selected sequence to control the operation of a motor and for switching said source of potential across said control step circuits;

means in series with said switching means in each of said control step circuits and forming a part thereof and responsive to the energization of each control step circuit for developing a signal proportional to the magnitude of the voltage thereacross;

means in series with said developing means in at least one of said control step circuits and forming a part thereof for delaying the operation thereof until a predetermined, fixed time period has elapsed; and means connected between said switch means and said developing means of a preceding control step circuit to the input of said delaying means in the next control step circuit for sensing and transmitting said voltage signal to pre-time the next delaying means when the switching means is left in the previous control step long enough for the next delaying means to time out so that the next control step is actuated immediately when the swiching means is advance thereto.

2. The pre-step timer circuit of claim 1, wherein: said source of potential is a DC source of approximately 230 volts.

3. The pre-step timer circuit of claim 1, wherein: said switching means is a master switch having a pair of contacts, one connected within each of said control step circuits for switching the control steps in the preselected sequence to control the operation of a DC motor.

4. The pre-step timer circuit of claim 1, wherein:

said delay means is a timer module acting as a high impedance initially when a voltage is applied thereacross and after it times out, it is equivalent to a normally closed contact.

5. The pre-step timer circuit of claim 1, wherein:

said developing means is an accelerating contactor coil which develops a voltage thereacross when energized.

6. The pre-step timer circuit of claim 1, wherein: said sensing and transmitting means is a resistor module having an ohmic value that is a function of that value of input current required to operate and time out said delaying means, and said resistor module is encapsulated in an epoxy resin or the like to prevent physical damage from shock, vibration, or atmospheric contaminants,

* * * * *